Figure 1:
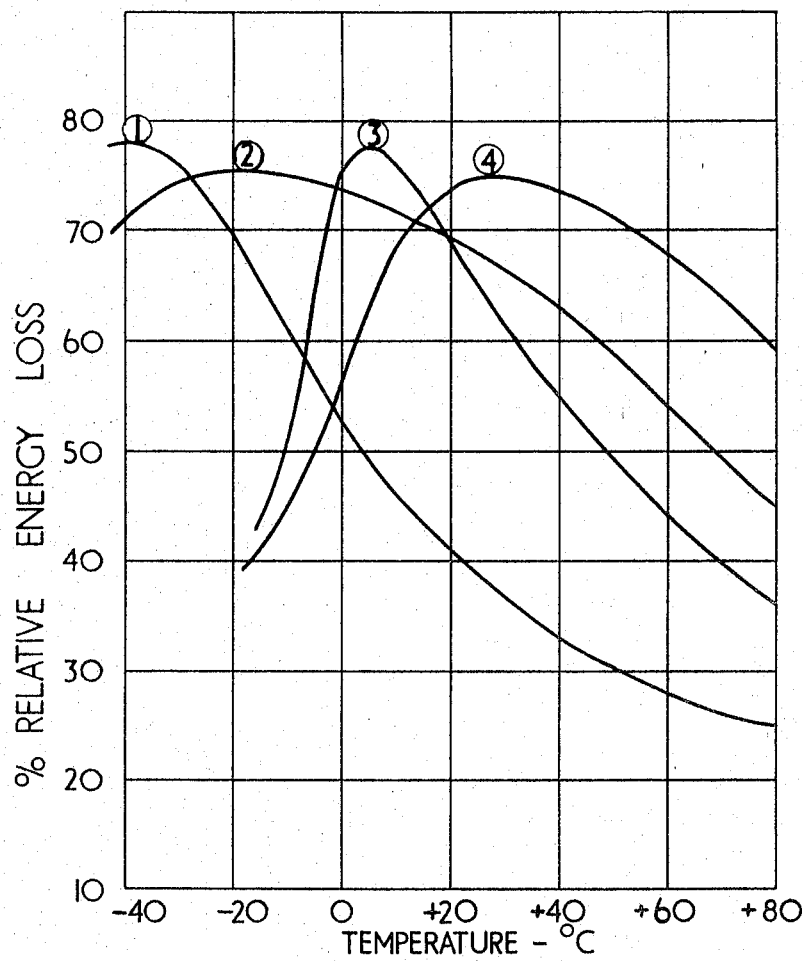

1. NATURAL RUBBER AT 50 C/S
2. NATURAL RUBBER AT $10^6$ C/S
3. 48% STYRENE SBR AT 50 C/S
4. 48% STYRENE SBR AT $10^6$ C/S 3,307,605
TIRES FOR MOTOR VEHICLES COMPRISING A BUTADIENE-STYRENE COPOLYMER HAVING A HIGH BOUND STYRENE CONTENT
Douglas Bulgin, Erdington, Birmingham, George Douglas Hubbard, Castle Bromwich, Birmingham, and Evelyn William Madge, Sutton Coldfield, England, assignors to Dunlop Rubber Company Limited, London, England, a British company
Filed June 29, 1965, Ser. No. 467,843
Claims priority, application Great Britain, Aug. 13, 1959, 27,683/59; Feb. 14, 1962, 5,649/62
8 Claims. (Cl. 152—330)

This invention relates to tires for motor vehicles and is a continuation-in-part of our application Serial Number 46,749, filed August 1, 1960, and our application Serial Number 253,252, filed January 23, 1963, both now abandoned.

Among the many desirable properties of tires are road gripping power, resulting in short braking distances and good cornering performance and road holding generally, lack of squeal when cornering or on hard braking, low noise generally, and riding comfort. Especially as regards gripping power and squeal, the conventional tires made of natural rubber or a synthetic rubber of the ordinary butadiene-styrene copolymer kind, having a bound styrene content of about 23% by weight, leave a good deal to be desired.

It is known that tires having a tread made from butyl rubber have better gripping power on wet roads, and for ordinary practical purposes do not squeal. However, this material possesses certain grave disadvantages over natural rubber and the butadiene-styrene copolymer rubber referred to above. For one thing it is highly impermeable to air, with the result that, as the tire is built up layer by layer, it is difficult to ensure that no air is trapped between adjacent layers; such trapped air forms "blisters" which are a serious hidden source of weakness in the finished tire. Moreover butyl rubber is difficult to bond to other materials, making it difficult to use in composite tires in which for example the tread is of a composition different from that of the body of the tire, and also making it very difficult to obtain good adhesion between the tire cords and the rubber. Furthermore butyl rubber is rather easily abraded.

It is an object of the present invention to provide tires which shall possess improved gripping power and lack of squeal compared with tires made from natural rubber or the conventional butadiene-styrene copolymer rubber without the disadvantages associated with butyl rubber mentioned above. We have discovered that improved road gripping performance and lack of squeal are obtained with tires in which the material of the tread consists of a vulcanized composition containing a butadiene-styrene copolymer having a higher bound styrene content than the copolymers that have been used in the tire treads heretofore.

We are of the opinion that this improved performance is related to the fact that the copolymers of higher styrene content have a higher second order transition temperature than the copolymers used heretofore. We have found that the second order transition temperature of a tire tread composition containing a copolymer and conventional compounding ingredients in the proportions usual in such compositions is determined by the copolymer except when an oil is included in the composition. If the oil has a second order transition temperature lower than that of the copolymer, the presence of the oil tends to reduce the second order transition temperature of the composition.

We have selected the butadiene-styrene copolymers having a bound styrene content in the range 35–50% for the production of tire treads. To the best of our knowledge no one before us has used such copolymers in tire treads, nor suggested such use, nor appreciated the advantages which result from such use.

In our application Serial Number 46,749 we described the use of tread material containing these copolymers which in its vulcanized form has a second order transition temperature above −35° C. In our application Serial Number 253,252 we described the use of a tread composition containing these copolymers in which the copolymer has up to 50 parts of hydrocarbon oil added to 100 parts of the copolymer, the oil being incorporated before coagulation of the latex from which the copolymer is derived, and the vulcanized tread composition has a second order transition temperature lower than −35° C.

The second order transition temperature, which is regarded as the temperature at which an elastomer passes from a glass-like to a rubber-like state, is usually determined by the "static" method of plotting a temperature-dependant property against temperature. The curve so obtained falls into two sections, and the point of discontinuity between them is taken as the second order transition temperature. The second order transition temperatures given in this specification were determined from measurements of thermal expansion at different temperatures: this is a well known method, and is described for example by M. L. Dannis in J. Applied Polymer Science, 1,121 (1959).

The copolymers can be obtained by the conventional methods (as used for example for making the ordinary butadiene-styrene copolymer synthetic rubber) merely altering the proportions of the starting materials. The most common of these methods for producing "cold dubber" involves polymerization of butadiene and styrene at about 5° C., as described in "Synthetic Rubber," edited by G. S. Whitby, page 321.

Some specific examples of second order transition temperatures for vulcanized rubber compositions are given in "The Physics of Rubber Elasticity" by L. R. G. Treloar—2nd Edition, page 311, Table VX, as follows:

$$° C.$$
Natural rubber ------------------------------- −55
GR–S --------------------------------------- −45

The abbreviation GR–S refers to a butadiene/styrene copolymer having a bound styrene content of 23% by weight.

We have obtained measurements of the second order transition temperature of tire tread compositions as follows:

|  | A | B |
|---|---|---|
| Natural Rubber | 100 |  |
| Styrene-butadiene copolymer (23% styrene) |  | 100 |
| Sulfur | 2.5 | 1.75 |
| Cyclohexyl Benzthiazyl Sulfenamide | 0.5 | 1.0 |
| Stearic Acid | 2.0 | 1.0 |
| Zinc Oxide | 5.0 | 3.0 |
| Nonox HFN (Antioxidant) | 1.0 | 1.0 |
| Santoflex AW (Antioxidant) |  | 1.5 |
| Mineral Oil | 5.0 | 7.0 |
| I.S.A.F. Black |  | 45 |
| HAF Black | 50 | 5 |
| Crumb |  | 10 |

(Nonox HFN is a blend of aryl amines; Santoflex AW is 6-ethoxy-1,2-dihydro-2,2,4-trimethyl-quinoline.)

Second order transition temperatures:

$$° C.$$
A ------------------------------------------- −68±2
B ------------------------------------------- −51±2

In the tread compositions of the tires of this invention, the high-styrene butadiene-styrene copolymers are not normally blended or combined with any other rubbery polymer.

It is not necessary that the whole of the tire be made of the high-styrene butadiene-styrene copolymer composition described above; thus a tread comprising one or more of these copolymers can be employed in combination with a tire body of natural rubber or a synthetic rubber of the ordinary butadiene-styrene copolymer type, and the readiness with which the copolymers can be caused to adhere to other materials makes this a far more satisfactory technique than it is with butyl rubber. The usual compounding ingredients will normally be used, and the casing construction can also be of any known type, e.g. it can employ high tenacity rayon, nylon or steel threads. When oil extenders are used the copolymer should be prepared at a high Mooney viscosity value so that after extending its Mooney viscosity value is in the normal processing range.

The compounding ingredients will normally be present in their usual proportions e.g. carbon black in a weight of 45–75 parts per 100 parts of copolymer or oil-extended copolymer, and sulfur in a weight of 0.5–5.0 parts per 100 parts of copolymer or oil-extended copolymer.

Figure 2:
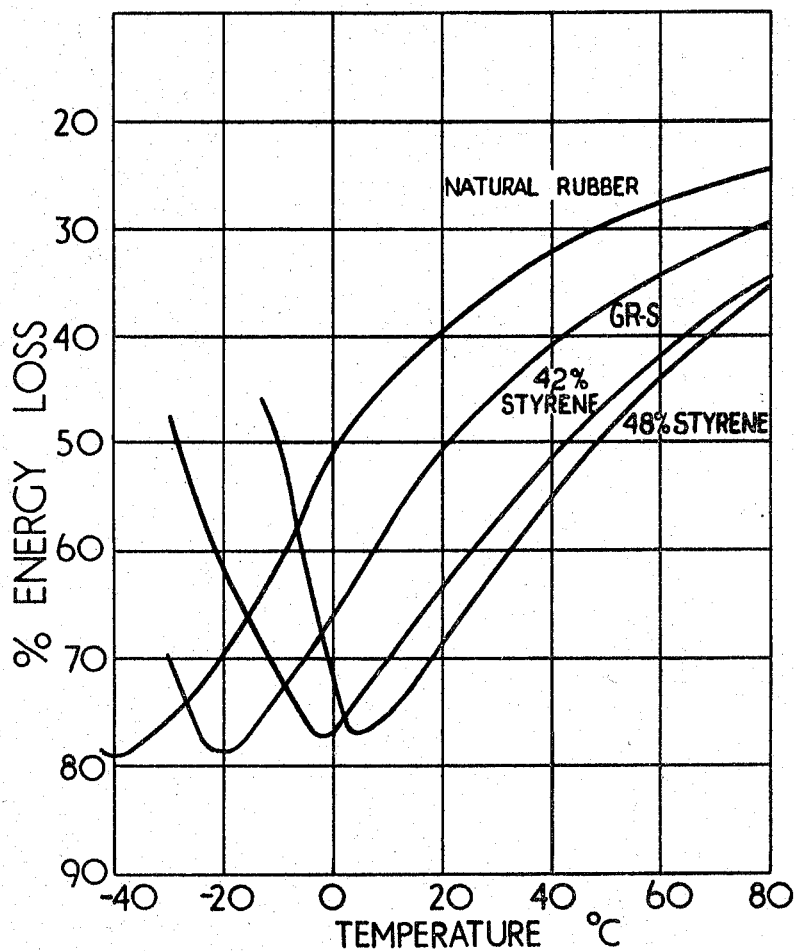
Figure 3:
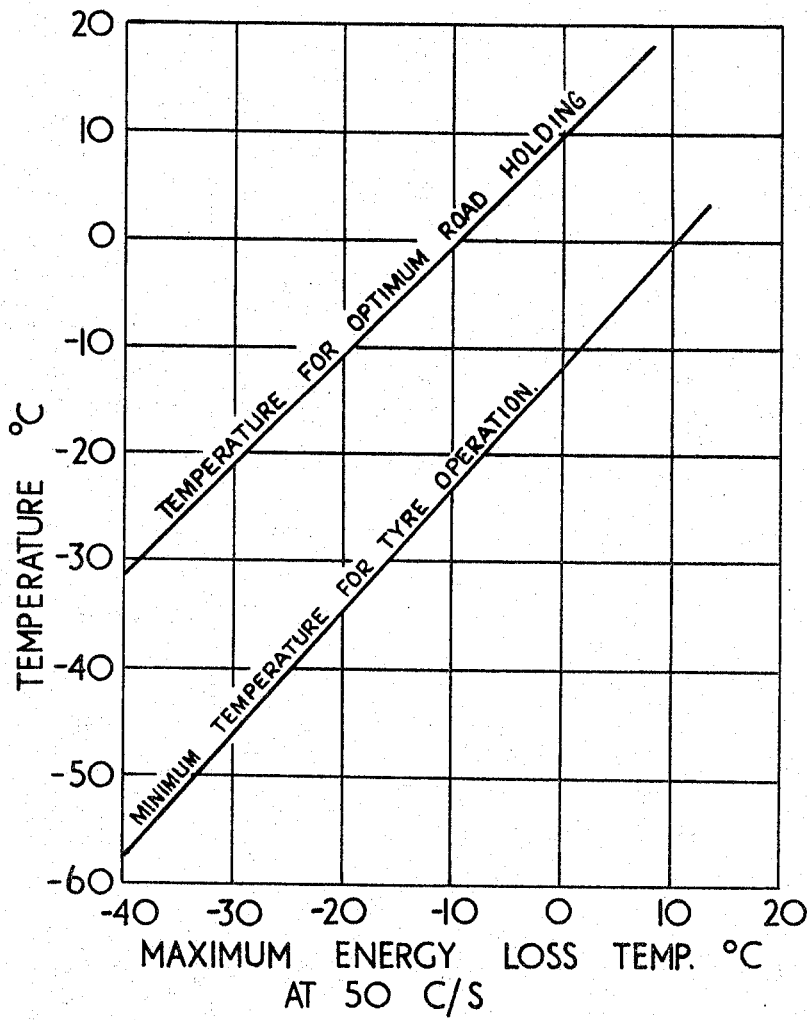
Figure 4:
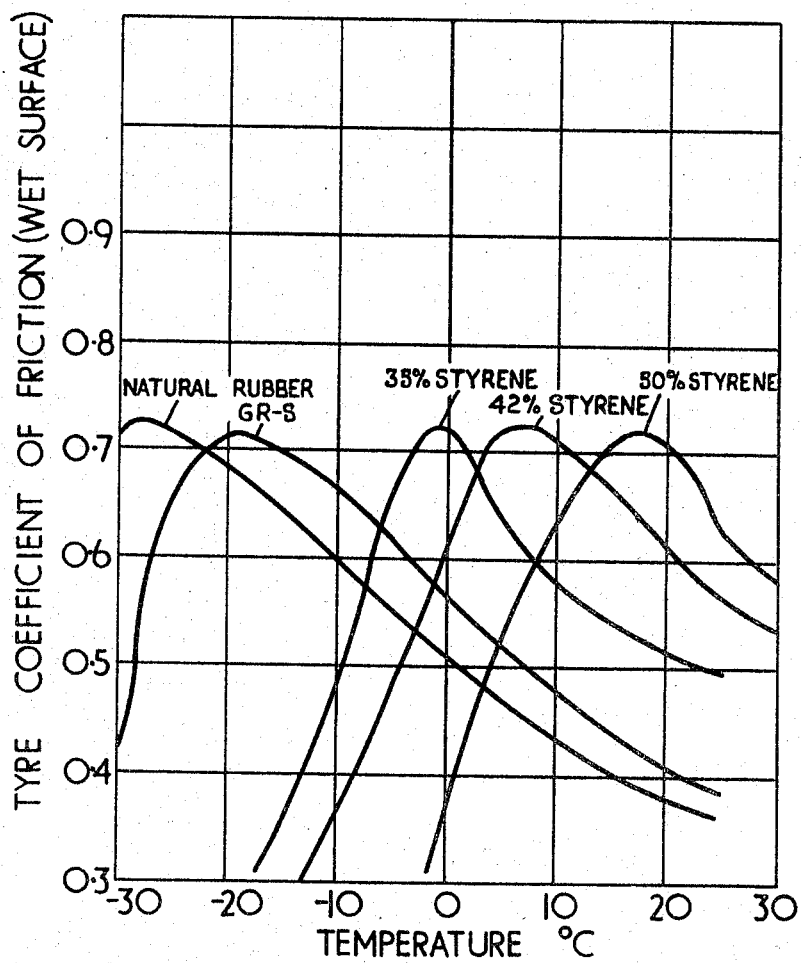

In a further description of the invention, reference will be made to the accompanying drawings, in which:

FIGURE 1 is a graph showing the relationship between relative energy loss and temperature for two rubber compositions, the energy loss being measured at two frequencies of deformation, FIGURE 2 is a graph in which energy loss at a single frequency is plotted against temperature for various rubber compositions, FIGURE 3 is a graph showing the relations between the road temperature at which a tire can be used and the maximum energy loss temperature at 50 cycles/sec., and FIGURE 4 is a graph in which tire coefficient of friction (wet surface) is plotted against temperature for various rubbers.

In the drawings the abbreviation GR–S refers to a composition containing a butadiene-styrene copolymer of styrene content 23 percent by weight. The abbreviations "X% styrene" and "X% styrene SBR" both refer to compositions containing a butadiene-styrene copolymer of styrene content X%.

It is believed that the excellent results, in particular the combination of good gripping power and lack of squeal with general riding comfort and resistance to abrasion, which are obtained in accordance with the invention are to be attributed to the general relationship between the energy loss of the copolymer employed, the temperature, and the frequency of deformation.

Typical curves relating energy loss to temperature, for natural rubber and for a butadiene-styrene copolymer containing about 48 percent of styrene, at frequencies of deformation of 50 cycles/sec. and 1,000,000 cycles/sec. are shown in FIGURE 1.

The surface of the tire which comes into actual contact with the road surface will normally be at a temperature which is about the same as or only a little above the road surface temperature i.e. 40° C., but during breaking or cornering the forces involved cause the surface layers of the tread rubber to deform at a high frequency, of the order of 1,000,000 cycles/sec. The energy loss under these conditions is seen to be very high for the 48% styrene butadiene/styrene copolymer resulting in good gripping power. Away from the road surface, however, the temperature in the tire rises as a result of the work expended in the continuously varying deformation of the tire. This deformation, however, occurs at a frequency of the order of 50 cycles/sec., depending upon vehicle speed. It is important to prevent the temperature from rising too high, say above 80° C. under ordinary conditions, and to this end low energy loss is required. The advantages of the tires of the invention can thus be ascribed to the fact that, under working conditions, there is a wide difference between the energy loss at the surface and in the body of the tire, so that in both areas it is of the order required to give the best results. This is impossible with natural rubber in which the energy loss does not change much within the ordinary operational temperature range. Similar arguments apply to the conventional butadiene-styrene copolymer rubber.

It is, moreover, well known that the effects of frequency and of temperature upon the energy loss of a polymer are not independent of one another, but are related to each other and to the second order transition temperature of the polymer by a time-temperature transform, as described by Williams, Landel and Ferry— Journal of the American Chemical Society, vol. 77, p. 3701 (1955).

It will be seen from the above discussion that the rubbers to be used in accordance with the invention could also be defined in terms of their temperature of maximum energy loss. The temperature of maximum energy loss at 50 cycles/sec. can be determined by means of the Rotary Power Loss Machine described by Bulgin and Hubbard in Trans. Inst. Rubber Ind. vol. 34, No. 5, and energy loss in the following paragraph means energy loss at 50 cycles/sec. Curves showing the relation of energy loss at 50 cycles/sec. to temperature are given in FIGURE 2 of the drawing, and it will be seen that a butadiene-styrene copolymer containing about 41 percent of styrene has a point of maximum energy loss at about −2° C., while when the styrene content is 48 percent the maximum energy loss occurs at about +4° C. Moreover with these two copolymers the energy loss is above 70 percent at temperatures of about −12° to +10° C., and −1° to +18° C., respectively. With an ordinary butadiene-styrene copolymer rubber on the other hand the maximum energy loss occurs at about −20° C., and the energy loss has already fallen below 70 percent at −4° C., while at 18° C., it is down to about 52 percent; natural rubber has a maximum energy loss at about −40° C., and at 18° C. the energy loss is only about 41 percent.

The above facts have important implications regarding the temperature of the tread surface at which the tire affords optimum road holding, and also the minimum temperature at which it can safely be used i.e. the point at which the tread composition becomes too hard to be of service. FIGURE 3 demonstrates this more precisely than the foregoing discussion, showing the curves relating the temperatures of maximum energy loss at 50 cycles/ sec. to the temperature of maximum energy loss at 1,000,000 cycles/sec. i.e. the temperature of optimum road holding. From these curves it will be seen that the copolymer containing 48 percent of styrene (FIGURE 2) will give optimum road holding at a road temperature of about 15° C., and that containing 42 percent of styrene at about 8° C. By contrast a copolymer having 23 percent of styrene will give optimum road holding at the much less useful temperature of about −11° C. and natural rubber at about −32° C.

In addition to the favourable relationships between energy loss and temperature exhibited by the butadiene-styrene copolymers of styrene content between 35 and 60 percent, and especially between 35 and 50 percent, these same copolymers have their maximum tire coefficients of friction at road temperatures much nearer to the normal road temperatures than do natural rubber and the ordinary butadiene-styrene copolymer rubbers, as will be seen from FIGURE 4. For example, at a road temperature of about 14° to 20° C. a sliding tire having a tread of a copolymer containing 50 percent of styrene has a coefficient of friction of 0.7 or above, as compared with about 0.4 for a copolymer containing 23 percent of styrene and rather less for natural rubber at 20° C. At 42 percent styrene content the copolymer has a coefficient of 0.7 or above at 3° to 11° C., while at this latter temperature the coefficient is 0.47 and 0.43 for the ordinary butadiene-styrene copolymer rubber and natural rubber respectively.

While butyl rubber has an energy loss/temperature relationship of the same general kind as the specified copolymers, the latter are more permeable to air to an extent which, while not substantially diminishing the air-holding qualities of the finished tire, does make it easy to ensure the absence of blisters formed by the retention of air during the formation of the tire. Also they are much more readily caused to adhere to other materials, so that tires comprising them are stronger in this respect, and they are also more resistant to abrasion, so that tires comprising them have a longer life than tires with a butyl rubber tread.

The following examples illustrate the invention.

*Example I*

A copolymer of butadiene and styrene having a bound styrene content of 40–42 percent by weight and prepared at a high Mooney viscosity value by polymerization at about 5° C. was compounded as follows:

|  | Parts by weight |
|---|---|
| Copolymer | 100 |
| Extender oil ("Sundex 53") | 37.5 |
| Sulfur | 2.2 |
| Cyclohexybenzylthiazyl sulfenamide | 1.2 |
| Stearic acid | 1.0 |
| Zinc oxide | 4.5 |
| Mineral oil | 5.0 |
| "Nonox" HFN (antioxidant—a blend of arylamines) | 1.0 |
| "Santoflex" AW (antioxidant) | 1.0 |
| Furnace black ("Philblack" O) | 70.0 |

(Sundex 53 is a moderately aromatic extender oil having a viscosity gravity constant of 0.936.)

Samples of this composition were vulcanized at 50 lbs./sq. in. steam pressure for 30 minutes after a 15 minute temperature rise.

The second order transition temperature was determined as −31° C.

Tires having a tread moulded from this composition and a body either of the same composition or of natural rubber (the whole tire being vulcanized) were found to have a considerably better gripping power than similar tires having a tread of natural rubber or butadiene-styrene copolymer of 23 percent styrene content, and to be free from squeal and to give rise to less noise generally. Their abrasion resistance was better than that of tires having a similar tread of butyl rubber. These tires are particularly suitable for use in temperate climates.

*Example II*

A copolymer of butadiene and styrene having a styrene content of about 48 percent by weight and prepared at a high Mooney viscosity value by polymerization at about 5° C. was compounded with the same ingredients as described in Example I.

Samples of the composition were vulcanized as in Example I and the second order transition temperature of the samples was measured as −27° C. The tires made from the composition had properties broadly similar to those of Example I, but were more suitable for use under tropical conditions, though like those of Example I useful also in a temperate climate.

Details of road tests carried out with these tires as Test Tires are given below. The "Control" tires were high class tires (sold in Great Britain under the registered trademark "Gold Seal") having a tread formed of a vulcanized composition containing a conventional butadiene/styrene copolymer having a bound styrene content of 23.5 percent. The composition was the same as that described in column 2 lines 50–70 having a second order transition temperature of about −51° C.

Wet braking—a measurement of retardation in terms of "g," on an average of six runs at 25 m.p.h.

|  | Surface | | |
|---|---|---|---|
|  | Dorset Pebbles | Asphalt | Cobbles |
| Test Tires | 0.27 | 0.33 | 0.33 |
| Control Tires | 0.20 | 0.275 | 0.22 |

Cornering—on smooth wet asphalt.

A measurement of the speed in miles per hour at which breakaway occurs:

|  | Rear End | Front End |
|---|---|---|
| Test Tires | 35 | 45 |
| Control Tires | 31 | 41 |

Squeal—at a tire temperature of 35° C.

Test tires _____g—no squeal__ 0.60
Control tires _____g—no squeal__ 0.25

These tests all show a substantial advantage to the test tire made in accordance with this example as compared to the conventional control tire.

We have found that a tire tread composition having a second order transition temperature above −35° C. is not particularly suitable for use in cold climates. We have found that good low temperature performance is obtained with a tire tread composition which has a somewhat lower second order transition temperature.

A specific group of very useful tread compositions which may be mentioned here to provide a practical illustration are those derived from a butadiene-styrene copolymer synthetic rubber having a styrene content of 36% by weight and correspondingly a butadiene content of 64% by weight, the weight of hydrocarbon oil added to 100 parts by weight of the copolymer before coagulation being 30±10 parts. The second order transition temperatures for these compositions can be brought down to the neighbourhood of −45° C., using as the extending oil "Sinclair 1559A" oil (see below) or its equivalent. (It should be understood that the effect of adding a given proportion of oil in reducing the second order transition temperature may vary according to the nature of the oil used.)

The compounding of the tread compositions for the tires of the present invention can generally follow the normal principles with respect to the natures and proportions of vulcanising agents, vulcanization accelerators, antioxidants, reinforcing fillers and so forth, subject to the recommendations given in the following description and provided the essential features specified above are present in the composition. However, it should be understood that the hydrocarbon oil present in the composition may include, apart from the 0 to 50 parts by weight of principal extending oil added per 100 parts of the copolymer before the coagulation of the latex from which the copolymer is derived, an additional proportion of oil, with or without tar, incorporated when the coagulated copolymer is compounded (e.g. 5% to 10% by weight of oil or oil tar, referred to the weight of the copolymer plus the principal extending oil already incorporated). The oil incorporated before coagulation may be of any of the varieties available commercially as oils suitable for use in extending polymers having high Mooney viscosities, but an example of a specific commercially available extending oil which we have found very satisfactory is that sold as "Sinclair 1559A" oil. As is usual in tire tread compositions, there may be incorporated a considerable proportion of carbon black as reinforcing filler, e.g. 45% to 75% by weight (referred to the weight of the copolymer plus extending oil incorporated before coagulation). A preferred grade of carbon black is super abrasion furnace black, but good results can also be obtained with intermediate super abrasion furnace black and high-abrasion furnace black. The vulcanization agents and accelerators are present in proportions suitable to give the degree of vulcanization usual in tire tread compositions.

As implied above, it is not necessary that the whole of the tire should be made of a composition of the kind specified; for the parts other than the tread there may be used natural rubber compositions or ordinary butadiene-styrene copolymer compositions (for example).

The copolymer in its uncompounded state preferably has a Mooney viscosity ("ML-4") at 120° C. of 30 to 65. (The determination of Mooney viscosities is explained in M. Mooney's paper in Industrial & Engineering Chemistry (Analytical Edition), 1934, volume 6, page 147). It is particularly preferred that the uncompounded copolymer should have a Mooney viscosity ("ML-4") at 120° C. of 35 to 55.

The following further examples illustrate the invention. All the "parts" given in the examples are parts by weight.

*Example III*

The oil-extended butadiene-styrene copolymer used had a butadiene-styrene ratio of 64:36 (by weight) and had been obtained by polymerization at about 5° C. 33 parts of extending oil (Sinclair 1559A oil) for every 100 parts of the copolymer had been incorporated before coagulation. The Mooney viscosity (ML-4 at 120° C.) of the oil-extended copolymer was 45±10. The copolymer was compounded as follows:

| | Parts |
|---|---|
| Copolymer (*including* oil) | 100 |
| Sulfur | 1.75 |
| Mercaptobenzthiazole | 1.0 |
| Stearic aid | 1.0 |
| Zinc oxide | 1.0 |
| Antioxidant ("Nonox" HFN) | 0.75 |
| Antioxidant ("Santoflex AW") | 0.75 |
| Mineral oil | 7.0 |
| Carbon black (high abrasion furnace black) | 50 |

Samples of the above vulcanizable composition were cured at 50 lbs./sq. in. steam pressure for 30 minutes after 15 minutes temperature rise. The second order transition temperature of the Samples was −45±2° C. The composition was used to form tire treads.

*Example IV*

The procedure followed was similar to that of Example III except in that 60 parts of SAF black were used instead of the 50 of HAF, only 1.0 part of sulfur was used, and half of the 7.0 parts of mineral oil were replaced by pine tar. The second order transition temperature was again −45°±2° C.

Road tests were carried out to compare 3 types of tire.

A. A tire having a tread of the composition of Example IV above.
B. A Dunlop "Elite" tire.
C. A tire having a tread of a vulcanized composition of an oil-extended copolymer of butadiene and styrene having a bound styrene content of 23 percent by weight extended with 37.5 parts of oil per 100 parts of copolymer.

The Dunlop "Elite" tire from standard 1961 production had a tread formed of a composition of an oil-extended copolymer of butadiene and styrene having a bound styrene content of 42 percent by weight extended with 20 parts of oil per 100 parts of the copolymer. The composition was made up as follows:

| | Parts |
|---|---|
| Oil-extended copolymer | 100 |
| Sulphur | 1.0 |
| Cyclohexyl benzthiazyl sulfenamide | 1.0 |
| Stearic acid | 1.0 |
| Zinc oxide | 3.0 |
| Nonox HFN (antioxidant) | 0.75 |
| Santoflex AW (antioxidant) | 0.75 |
| Mineral oil | 7.0 |
| SAF black | 50.0 |

Results of the road tests are given in arbitrary units, taking the conventional tire C as standard at 100. The tests were as follows:

Test I.—Deceleration in locked-wheel braking on wet asphalt surface.
Test II.—Sideways grip on wet asphalt surface.
Test III.—Resistance to wheel-spin on wet Dorset pebble surface.

TABLE OF RESULTS

| | Tire A | Tire B | Tire C |
|---|---|---|---|
| Test I | 107 | 109 | 100 |
| Test II | 131 | 124 | 100 |
| Test III | 115 | 121 | 100 |

As will be seen the tires A and B both show improved road holding compared to the conventional tire.

Tire A shows an improvement over Tire B in respect of low-temperature behaviour as shown in Table 2 below, which gives drawbar pull figures for tests in Sweden in winter.

TABLE 2

| Test | Tire A | Tire B |
|---|---|---|
| IV | 515 | 420 |
| V | 165 | 110 |

The figures given are mean drawbar pulls in lb. wt. for 6 tests in each case. Test IV was a dynamic traction test at −18° C. on ice, in which a vehicle fitted with the tires in question towed a second vehicle whose brakes were gradually applied; the figure recorded was the maximum pull at the drawbar just before the rear wheels of the towing vehicle started to spin. Test V was a static spin test at −20° C. on ice, in which a vehicle fitted with the tires in question was "anchored" to a post through a tension-recording device, and the pull at the drawbar resulting from a steady low-speed wheelspin was measured.

Finally reference may be made to the minimum temperatures at which the three types of tire tread under discussion will give satisfactory service. For Tire B the lowest temperature for satisfactory service is −15° C., but for both Tire A and Tire C the lowest temperatures for satisfactory service were below −24° C. (−24° C. was the lowest temperature at which tests were made).

The term "cold" rubber as used in the following claims is well known in the art and is referred to on page 321 of "Synthetic Rubber" edited by G. S. Whitby, published by John Wiley and Sons Inc., 1954, as follows: "The name 'cold rubber' is given to polymers made at temperatures below room temperature. GR–S polymerized at 5° C. (41° F.) is being made on a very large scale at present."

Having now described our invention—what we claim is:
1. A vehicle tire comprising a tire body and a road-contacting tread in which at least the material of the tread comprises a vulcanized butadiene-styrene copolymer rubber composition wherein the elastomeric portion is a copolymer of butadiene and styrene having a bound styrene content of 35–50 percent and correspondingly a bound butadiene content of 65–50 percent by weight, and a hydrocarbon extender oil is also present.

2. A vehicle tire comprising a tire body and a road-contacting tread in which at least the material of the tread comprises a vulcanized butadiene-styrene copolymer "cold" rubber composition wherein the elastomeric portion is a copolymer of butadiene and styrene having a bound styrene content of 35–50 percent and correspondingly a bound butadiene content of 65–50 percent by weight, a hydrocarbon extender oil being present in the composition, together with 45–75 parts by weight of carbon black per 100 parts of copolymer, and 0.5–5.0 parts by weight of sulfur per 100 parts of copolymer.

3. A vehicle tire comprising a tire body and a road-contacting tread in which at least the material of the tread comprises a vulcanized butadiene-styrene copolymer rubber composition containing as the elastomeric portion an oil-extended "cold" rubber consisting of a copolymer of butadiene and styrene having a bound styrene content of 35–50 percent and correspondingly a bound butadiene content of 65–50 percent by weight, a hydrocarbon extender oil being present in the composition in an amount of up to 50 parts of oil per 100 parts by weight of the copolymer, together with 45–75 parts by weight of carbon black per 100 parts of copolymer plus oil, and 0.5–5.0 parts by weight of sulfur per 100 parts of copolymer.

4. A vehicle tire comprising a tire body and a road-contacting tread in which at least the material of the tread comprises a vulcanized butadiene/styrene copolymer rubber composition wherein the elastomeric portion is a copolymer of butadiene and styrene having a bound styrene content of 35–50 percent and correspondingly a bound butadiene content of 65–50 percent by weight, a hydrocarbon extender oil being present in the composition, the second order transition temperature of the vulcanized composition being within the range −48 to −10° C.

5. A vehicle tire comprising a tire body and a road-contacting tread in which at least the tread material comprises a vulcanized butadiene-styrene copolymer rubber composition wherein the elastomeric portion is a copolymer of butadiene and styrene having a bound styrene content of 35–50 percent by weight and correspondingly a bound butadiene content of 65–50 percent by weight, a hydrocarbon extender oil being present in the composition, the said tread material in its vulcanized form having a second order transition temperature within the range −35 to −10° C.

6. A road vehicle tire comprising a tire body and a road-contacting tread which has at least its tread composed of a vulcanized butadiene-styrene copolymer rubber composition wherein the elastomeric portion is a copolymer of butadiene and styrene having a bound styrene content of 35–50 percent by weight and correspondingly a bound butadiene content of 65–50 percent by weight, and containing hydrocarbon extender oil incorporated before coagulation of the latex from which the copolymer is derived, the weight of this oil added to 100 parts by weight of the copolymer being up to 50 parts by weight, the oil content being sufficient to give a vulcanized composition having a second order transition temperature within the range −35° to −48° C.

7. A road vehicle tire comprising a tire body and a road-contacting tread which has at least its tread composed of a vulcanized butadiene-styrene copolymer rubber composition wherein the elastomeric portion is a copolymer of butadiene and styrene having a bound styrene content of 35–50 percent by weight and correspondingly a bound butadiene content of 65–50 percent by weight and containing first hydrocarbon extender oil incorporated before coagulation of the latex from which the copolymer is derived, the weight of this oil added to 100 parts by weight of the copolymer being up to 50 parts by weight, together with further hydrocarbon extender oil amounting to 2.5–10 parts by weight added to 100 parts of the copolymer plus first oil after coagulation of the latex from which the copolymer is derived, the second order transition temperature of the vulcanized composition being within the range −35° C. to −48° C.

8. A road vehicle tire comprising a tire body and a road-contacting tread which has at least its tread composed of a vulcanized butadiene-styrene copolymer rubber composition wherein the elastomeric portion is a copolymer of butadiene and styrene having a bound styrene content of 35–50 percent by weight and containing hydrocarbon extender oil incorporated before coagulation of the latex from which the copolymer is derived, the weight of this oil added to 100 parts by weight of the copolymer being up to 50 parts by weight, together with 45 to 75 parts by weight of carbon black and 0.5–5.0 parts by weight of sulfur added to 100 parts of the copolymer plus oil, the second order transition temperature of the vulcanized composition being in the range −35° C. to −48° C.

References Cited by the Examiner

UNITED STATES PATENTS 2,964,083  12/1960  Pfau et al. _____ 260—33.6

MORRIS LIEBMAN, *Primary Examiner.*

A. LIEBERMAN, *Assistant Examiner.*